(12) United States Patent
Roberts

(10) Patent No.: US 9,107,386 B2
(45) Date of Patent: Aug. 18, 2015

(54) ANIMAL HOUSES

(75) Inventor: John Roberts, High Ongar (GB)

(73) Assignee: Petz Podz Limited (GB)

( * ) Notice: Subject to any disclaimer, the term of this patent is extended or adjusted under 35 U.S.C. 154(b) by 0 days.

(21) Appl. No.: 13/877,694

(22) PCT Filed: Oct. 3, 2011

(86) PCT No.: PCT/GB2011/051878
§ 371 (c)(1),
(2), (4) Date: May 7, 2013

(87) PCT Pub. No.: WO2012/046035
PCT Pub. Date: Apr. 12, 2012

(65) Prior Publication Data
US 2013/0319343 A1 Dec. 5, 2013

(30) Foreign Application Priority Data

Oct. 4, 2010 (GB) .................................. 1016682.5

(51) Int. Cl.
*A01K 1/00* (2006.01)
*A01K 1/03* (2006.01)

(52) U.S. Cl.
CPC .. *A01K 1/03* (2013.01); *A01K 1/033* (2013.01)

(58) Field of Classification Search
CPC ..... A01K 1/0245; A01K 1/033; A01K 1/034; A01K 1/0218; A01K 1/0281; A01K 1/03; A01K 1/031
USPC ......... 119/416, 452, 474, 483, 484, 481, 482, 119/496, 497, 498, 499, 501, 512, 513, 514
See application file for complete search history.

(56) References Cited

U.S. PATENT DOCUMENTS

| 920,975 | A | | 5/1909 | Minion | |
|---|---|---|---|---|---|
| 2,790,414 | A | * | 4/1957 | Rossow | 119/497 |
| 3,509,855 | A | * | 5/1970 | Priddy, Jr. | 119/497 |
| 4,220,119 | A | * | 9/1980 | Albright | 119/497 |
| 4,397,398 | A | * | 8/1983 | Watanabe | 220/7 |
| 4,462,335 | A | * | 7/1984 | Ahrens | 119/445 |

(Continued)

FOREIGN PATENT DOCUMENTS

| FR | 2227818 A1 | 11/1974 |
|---|---|---|
| GB | 114108 A | 3/1918 |

OTHER PUBLICATIONS http://www.omlet.co.uk/products_services/products_services.php?cat=Eglu+Classic, Product lanuched Apr. 2004.

(Continued)

*Primary Examiner* — Yvonne Abbott-Lewis
(74) *Attorney, Agent, or Firm* — Barnes & Thornburg LLP

(57) ABSTRACT

An animal house (1) comprises a base (2) and a cover (3) affording a roof and side walls for the house (1) and engaging with the base (2), to which it is attached by a hinge. Releasable fastening means (5) secure the cover (3) to the base (2) such that, when released, the cover (3) may be removed to afford access to the base (2) from above. An end wall (4, 12) of the houselengages one side of the base (2). A panel (12) of the end wall is removable and exchangeable with other panels of different configurations, to suit different animals and/or occasions. Modular inserts (11) fit into the base (2) and are exchangeable with other inserts of different configurations, to suit different animals and/or occasions.

18 Claims, 6 Drawing Sheets

(56) References Cited

U.S. PATENT DOCUMENTS

| | | | |
|---|---|---|---|
| 4,781,147 A * | 11/1988 | Delino, Jr. | 119/453 |
| 4,803,952 A * | 2/1989 | Houser | 119/499 |
| 5,522,347 A * | 6/1996 | Merino | 119/165 |
| 5,551,371 A * | 9/1996 | Markey et al. | 119/499 |
| 5,575,239 A * | 11/1996 | Bradburn et al. | 119/500 |
| 6,571,740 B1 * | 6/2003 | Kinder et al. | 119/497 |
| 6,863,030 B2 * | 3/2005 | Axelrod | 119/498 |
| 7,243,614 B1 | 7/2007 | Byers | |
| 7,337,748 B1 * | 3/2008 | Morris | 119/482 |
| 7,341,020 B2 * | 3/2008 | Ryan | 119/161 |
| 7,458,336 B2 * | 12/2008 | Eu | 119/51.02 |
| 7,703,414 B2 * | 4/2010 | Kanno | 119/418 |
| 7,856,945 B2 * | 12/2010 | Matsuo et al. | 119/166 |
| 7,886,486 B2 * | 2/2011 | Lomax et al. | 49/169 |
| 7,987,818 B2 * | 8/2011 | Matsuo et al. | 119/168 |
| 8,056,511 B1 * | 11/2011 | Espinoza et al. | 119/496 |
| 8,069,820 B2 * | 12/2011 | Anderson et al. | 119/498 |
| 8,127,719 B2 * | 3/2012 | Jakubowski et al. | 119/499 |
| 8,132,537 B2 * | 3/2012 | Trunnell et al. | 119/496 |
| 8,141,518 B2 * | 3/2012 | Pierpont | 119/473 |
| 8,413,472 B2 * | 4/2013 | Chiang | 70/63 |

OTHER PUBLICATIONS http://www.omlet.co.uk/files/public/eglu_instructions_mk2.pdf, Product lanuched Apr. 2004.

* cited by examiner

ANIMAL HOUSES

The present invention relates to animal houses, and particularly, but not exclusively, to domestic animal houses.

There are numerous different domestic animal houses on the market. There are those that are specific to the particular type of pet being cared for, and there are also those that are specific to a particular situation. In the context of this specification, the term 'animal house' includes any enclosed space for housing an animal, including a base, roof and side walls. Hutches, cages, kennels and coops are well-known houses, typically for use outdoors. They are designed to provide protection from the elements, and from likely predators. They often comprise a wooden frame, with one or more wire mesh walls.

Pet owners often have a range of houses for different purposes. Such as when keeping a dog as a pet, they might have a kennel in the garden, a cage in the boot of the car, a carrier for transporting the dog to and from a destination such as a veterinary surgery and an indoor den, all to protect and shelter a pet in different situations.

Pet house manufacturers therefore need to design each house to suit not only a different animal being kept as a pet, but also the different situations that might require a house for that pet.

There is also a growing trend to keep domesticated fowl such as chickens as pets, even in built-up areas. Chicken coops are typically wooden and mesh structures, and therefore not designed to be in keeping with modern trends.

Plastic animal houses attempt to solve this problem, by being in keeping with modern trends, whilst also providing a convenient housing for an animal. A plastic structure does not only appear modern, it also has a number of attributes that make it easier when it comes to maintenance and cleaning. Owners routinely inspect the inside of an animal's house, to replace foodstuffs, bedding, water and other items. They are also regularly required to clean out the house. A plastic structure provides a more durable means of housing the animal, can be swept out and hosed if necessary, and does not rust and corrode when subjected to environmental conditions, unlike the wood and metal alternatives.

The cost of manufacturing a range of houses specific to each type of animal, and for use in all of the different situations when an owner might wish to enclose that animal is substantial.

Preferred embodiments of the present invention aim to provide animal houses that are suitable for a number of different domestic animals, and for enclosing the animal in a number of different situations.

According to one aspect of the present invention, there is provided an animal house comprising:
a base;
a cover affording a roof and side walls for the house and engaging with the base;
releasable fastening means arranged to secure the cover to the base such that, when released, the cover may be removed to afford access to the base from above; and
an end wall of the house, the wall engaging the base along one side thereof:
wherein at least part of the end wall is removable.

Preferably, the end wall comprises an arch extending upwardly from the base and closure means engaging with the arch.

Preferably, the arch is integrally formed with the base.

Preferably, the cover is pivotally secured to the base by a hinge.

Said end wall may comprise a wire mesh.

Alternatively, said end wall may comprise a panel that incorporates a door or an opening for an animal to enter or leave the house.

Said door may comprise a ramp secured by a hinge to the panel.

Preferably, said panel is removable such that it may be exchanged with another panel.

Preferably, the base is provided with a plurality of exchangeable inserts to provide facilities for different animals.

Said exchangeable inserts may include one or more of the group comprising feeding receptacles, roosting receptacles, perching bars and litter trays.

Preferably, another end wall extends upwardly from the base, is disposed along one side thereof, and incorporates a plurality of ventilation holes.

Said base may incorporate a plurality of legs to raise the animal house above ground level.

Said base may incorporate a plurality of wheels for moving the animal house.

Alternatively, said base comprises securing means for securing the animal house to a surface.

Preferably, the base, end wall and cover comprise plastics material.

Preferably, said base, end wall and cover are formed by injection moulding.

Said animal house may comprise an animal run that engages with the base, end wall and/or cover.

According to an alternative aspect of the present invention, there is provided an animal house comprising:
a base having a floor arranged to support an animal in the house, the floor being defined at least partly by a removable insert;
a plurality of said removable inserts, each adapted to a different animal;
a cover affording a roof and side walls for the house and engaging with the base; and
releasable fastening means arranged to secure the cover to the base such that, when released, the cover may be removed to afford access to the base from above.

According to a further aspect of the present invention, there is provided an animal house comprising:
a base;
a cover affording a roof and side walls for the house and engaging with the base; and
releasable fastening means arranged to secure the cover to the base such that, when released, the cover may be removed to afford access to the base from above;
wherein the cover is secured to the base by a hinge.

For a better understanding of the invention and to show how embodiments of the same may be carried into effect, reference will now be made, by way of example, to the accompanying diagrammatic drawings, in which.

In the figures, like references denote like or corresponding parts.

Figure 1:
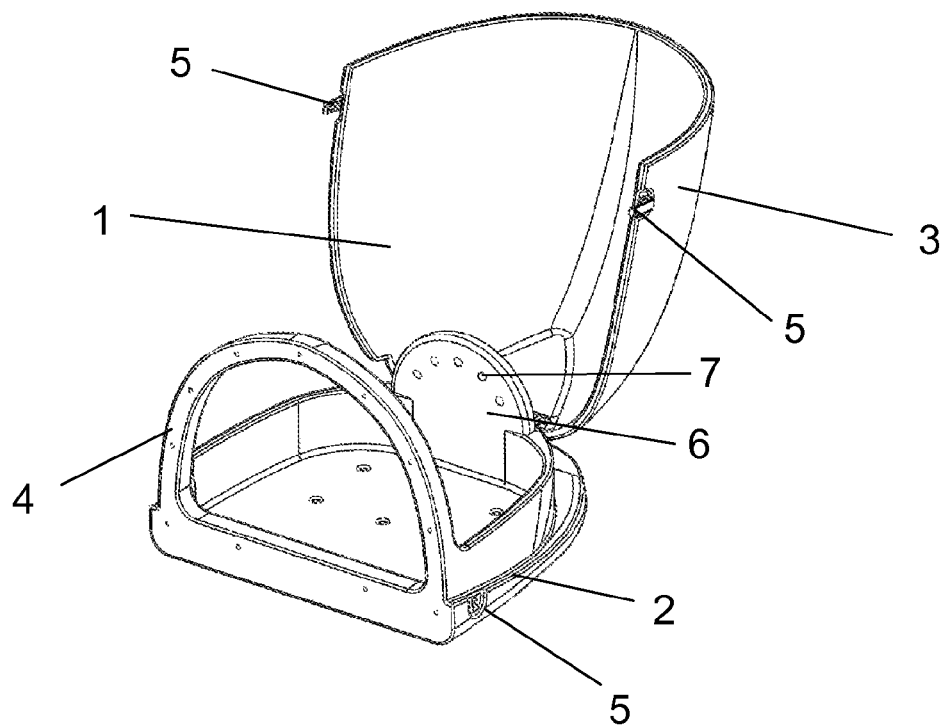
FIG. 1 illustrates one example of an embodiment of an animal house with a cover in an open position.

The animal house 1, as shown in FIG. 1, provides a dwelling for a number of different domestic animals on a number of different occasions. The animal house 1, in its basic form, comprises a base 2 with upstanding arch 4, and cover 3. The arch 4 can be formed as an integral part of the base 2, or consist of a separate piece that is joined to the base 2 by any suitable means, such as being configured to slot together, riveted or bolted. Where the arch 4 is an integral part of the base 2, the animal house 1 in its basic form comprises a two part construction, with the cover 3. This configuration of animal house 1 therefore provides a form of shelter for an animal with open front. An example of where this arrangement might be of use is within the boot of a vehicle, to protect an animal such as a dog when in transit.

The cover 3 is provided with fastening means 5 to secure the cover 3 to the base 2. The fastening means 5 as shown in FIG. 1 comprises a latch on either side of the open end of the cover 3, that can be releasably secured to the base 2, with corresponding connectors at either side of the arch 4. The fastening means 5 may also comprise any other suitable means for releasably securing the cover 3 to the base 2, such as with a clip that engages with a socket or a hook that loops through a ring. The cover 3 may also incorporate carrying handles, not shown in the figures, that enable the animal house 1 to be carried to a different location when the cover 3 is in a closed position, and the fastening means 5 is secured. The handles also provide assistance when opening the cover 3 to access the inside of the animal house 1, for care of the animal and other maintenance purposes.

The cover 3, as shown in FIG. 1, is of a shape that forms the roof and remaining side walls of the animal house 1 when in a closed position. The base 2 may also incorporate a raised rim to assist with engaging the cover 3 to the base 2, and to prevent a draught from being felt by the animal about the periphery of the animal house 1. The cover 3 in one form may comprise a generally part-spherical shape as shown, or in an alternative form may be of a more rectangular box shape (not shown).

Figure 2:
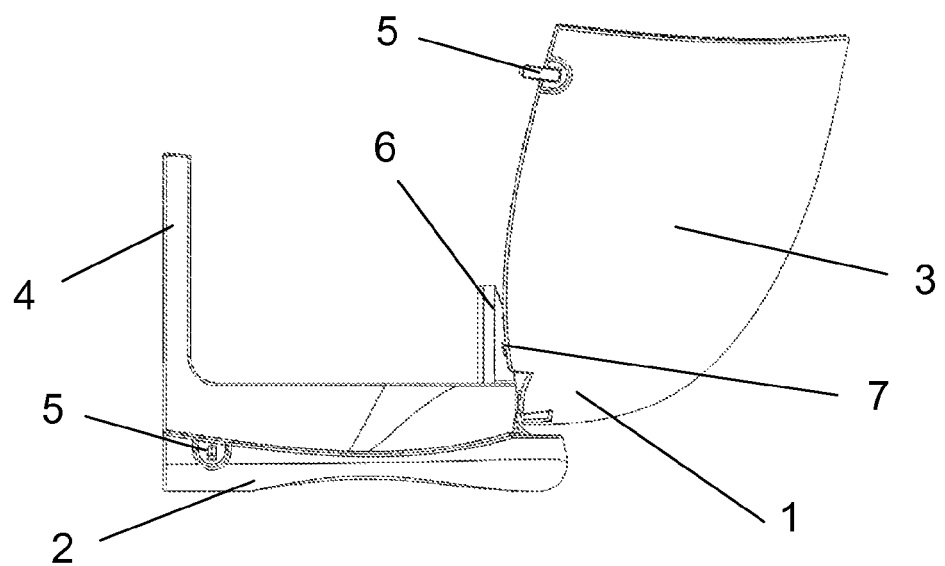
FIG. 2 shows a side view of the animal house of FIG. 1 showing one example of a hinge that pivotally connects a base portion to the cover, shown in an open position.

For ventilation purposes, and to ensure that fresh air reaches the animal when housed within the animal house 1, the base is provided with a short end wall 6 that incorporates a plurality of ventilation holes 7. This end wall 6 allows the flow of air through the animal house 1. As shown in FIG. 2, the end wall 6 is located along one side of the base 2, opposite the side of the base 2 from the arch 4. The end wall 6 may be integrally formed with the base 2, or it may be a separate part that is joined to the base by any suitable means, such as the base 2 being shaped to allow the end wall 6 to be slotted into it when required, and retained in position. The weight of the end wall 6 may help to counterbalance the cover 3 when open and, to this end, the end wall 6 may be of a material of greater weight than the rest of the base 2. The cover 3 may be provided with restraining means that engages with the end wall 6, base 2, or a component carried by the base 2, to limit the extent to which the cover 3 may be opened. Such restraining means may be releasable.

Figure 3:
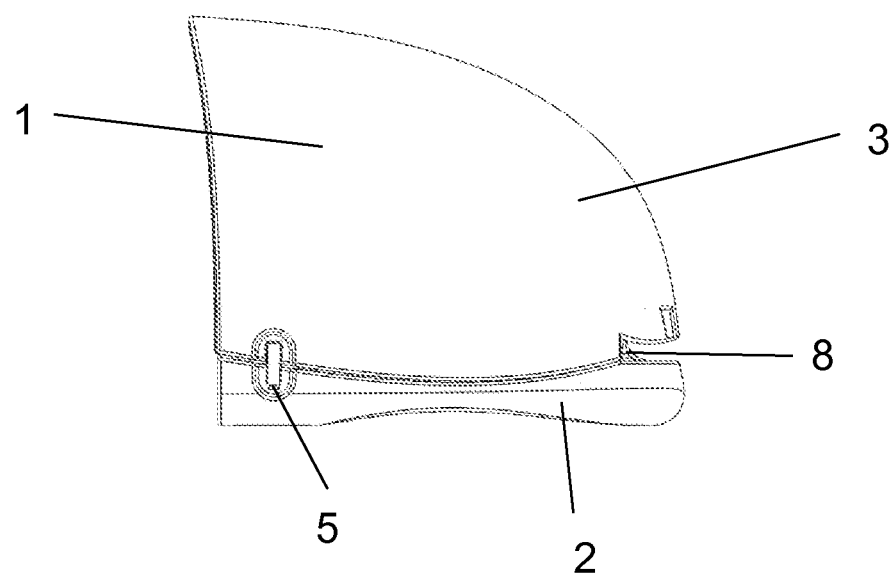
FIG. 3 shows a side view of the animal house of FIGS. 1 and 2 showing the cover in a closed position.

FIG. 3 shows the cover 3 in a closed position with the fastening means 5 fastened to join the cover 3 to the base 2. The cover 3 and the base 2 are pivotally secured to each other through a hinge 8. The hinge 8 enables the cover 3 to be opened right back away from the base 2, to enable an owner of the animal ease of access to the inside of the animal house 1. Typically the owner will need to gain access to the interior of the animal house 1 at least once a day to replenish food and water supplies, and check on the animal contained therein. The hinge 8 enables the cover 3 to be removed as much or as little as possible from the base 2 for checking purposes, and ensures that this can be achieved using just one hand where necessary, with the other hand free to help keep the animal inside, or to replenish foodstuffs.

Figure 4:
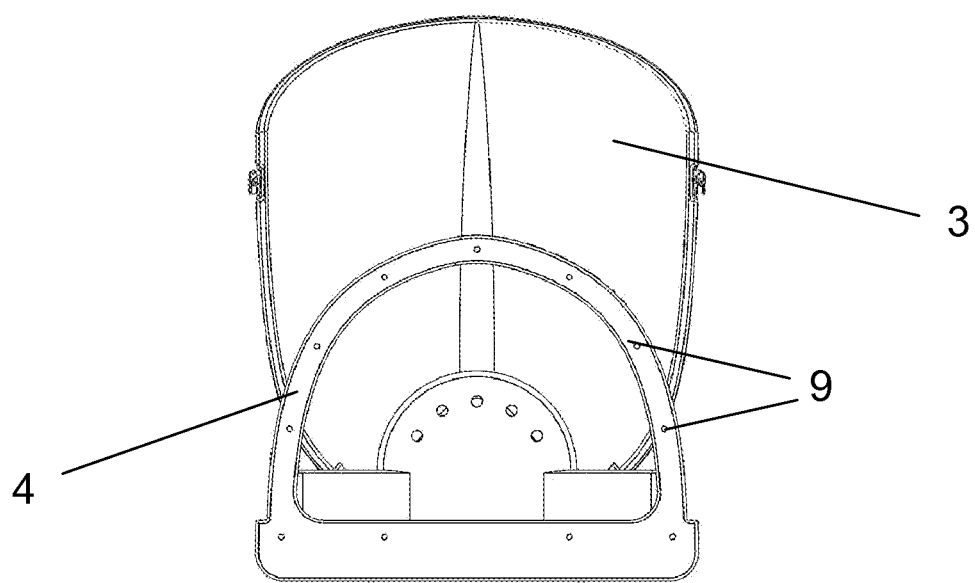
FIG. 4 shows an end view of the animal house of FIG. 2 showing an arch and an end wall with ventilation holes upstanding from the base portion.
Figure 5:
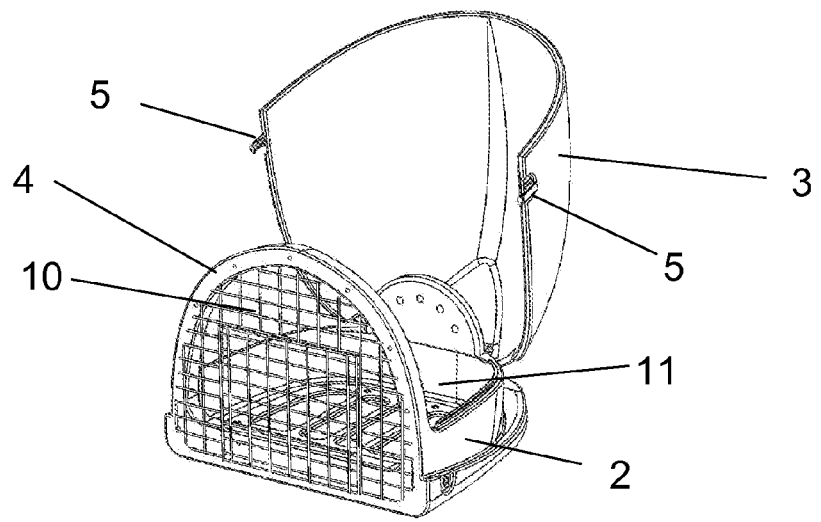
FIG. 5 shows an isometric view of the animal house of FIG. 1, with an interchangeable insert for canine use, and a grill affixed to the arch.

The animal house 1 may incorporate a plurality of holes 9, as shown in FIG. 4, within the arch 4 for attaching the animal house 1 to a number of other structures. FIG. 5 shows these holes 9 being used to support a closure means 10 within the arch 4. The closure means 10 shown in FIG. 5 is a wire mesh structure, or any suitable form of grille, that is attached in such a way as to close off the arch 4 of the animal house 1, to prevent the animal being housed inside from being able to get out through the arch 4. This closure means 10 is designed for an animal house 1 for housing a pet such as a dog, thereby forming a kennel in which to keep the dog outdoors or indoors, within a vehicle or otherwise. The grille 10 may have a door in it.

Figure 11:
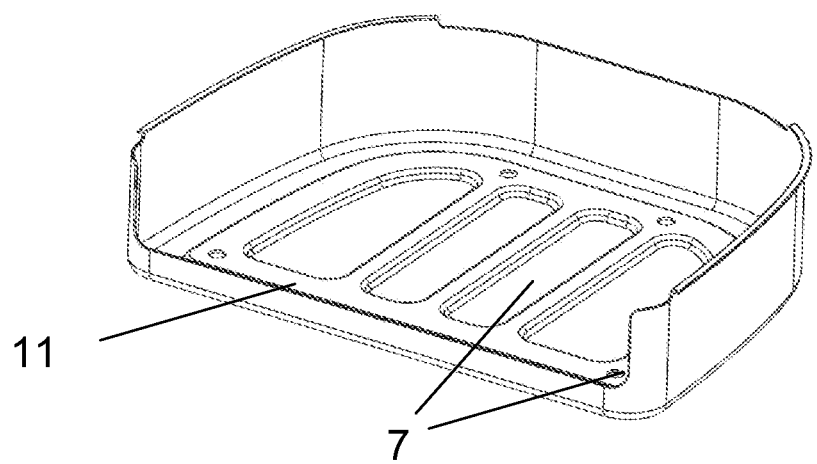
FIG. 11 shows one example of an interchangeable insert for canine use.

The animal house 1 can be supplied with a plurality of different exchangeable inserts 11, that are placed within the base 2 as and when required. The inserts 11 and base 2 are designed to be of modular form—that is, all of the different exchangeable inserts are configured to conform to the shape and size of that part of the base 2 (typically, a recess) with which the inserts engage. The exchangeable inserts 11 are specific to the animal being contained within the animal house 1. The exchangeable insert 11 as shown in FIGS. 5 and 11 has been designed for canine use, and comprises a dog bed structure with ventilation holes 7 to assist with circulating air about the animal.

Figure 6:
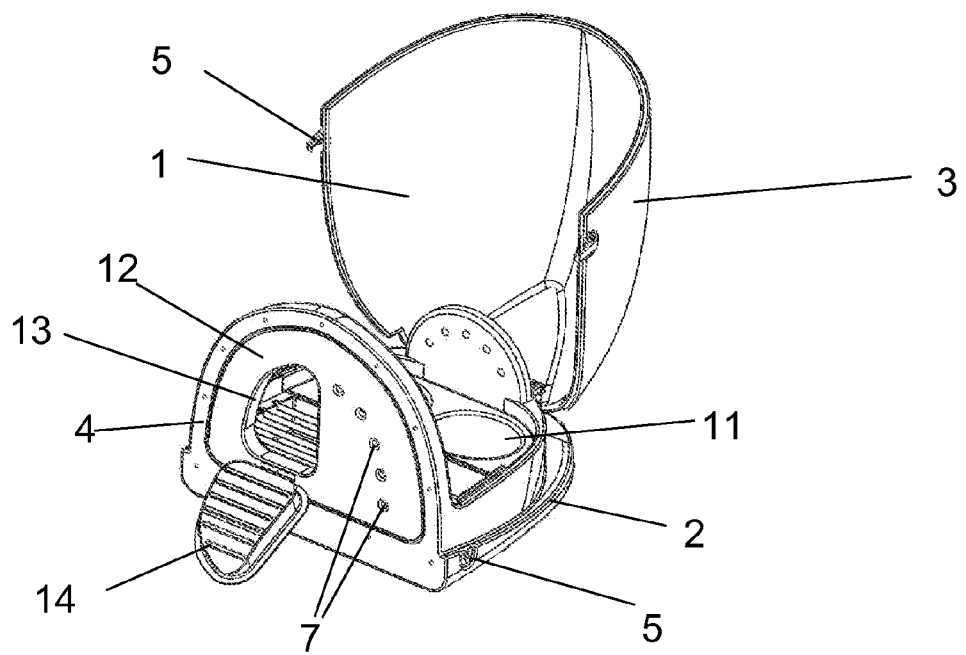
FIG. 6 shows an isometric view of the animal house of FIG. 1, with interchangeable inserts within the base for use when housing poultry, and provided with a plate within the arch with doorway and ramp.
Figure 9:
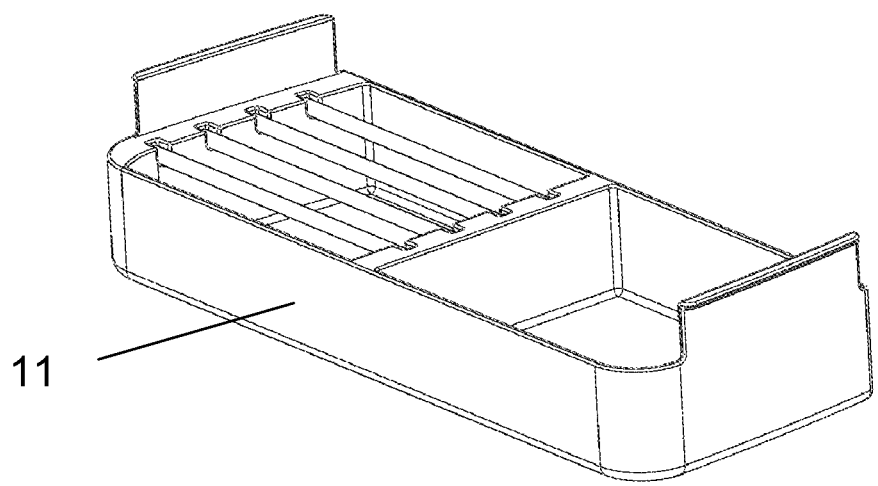
FIG. 9 shows one example of an exchangeable insert for use when housing poultry.
Figure 10:
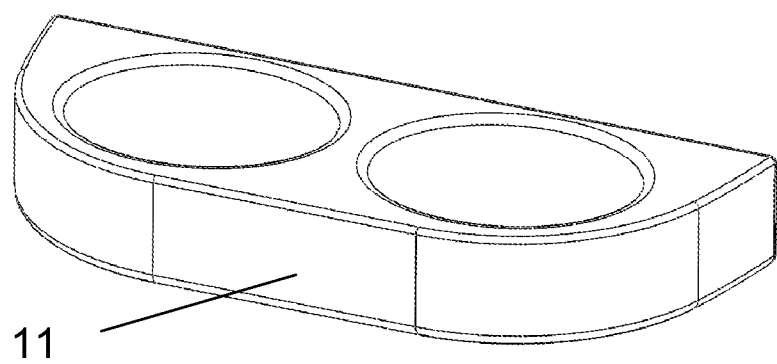
FIG. 10 shows another example of an exchangeable insert for use when housing poultry.

FIG. 6 shows an animal house 1 with an alternative configuration of exchangeable inserts 11, designed for use when keeping poultry. These exchangeable inserts might comprise feeding bowls, nesting boxes, perching bars or litter trays. Each of these exchangeable inserts 11, can be lifted out of the base 2 as and when required, for cleaning purposes or otherwise. The owner can effectively design the interior of their animal house 1 according to the requirements of the animal that they are housing. The exchangeable inserts 11 may also be provided with a raised lip or tabs for ease of extracting them from the base 2. Examples of inserts 11 are shown in FIGS. 8, 9 and 10

FIG. 6 also shown an alternative configuration of closure means, again specific to the animal being housed within the animal house 1. The closure means comprises a panel 12 that is releasably secured within the arch 4. The panel 12 may incorporate a plurality of ventilation holes 7. The panel 12 may also incorporate a doorway or opening 13 to enable an animal to enter and exit the animal house 1. The doorway 13 may also be provided with a door 14, which is attached to the panel 12 by a hinge. This enables the door 14 to drop down from the doorway 13 to form a ramp. The ramp may be provided with ridges or rungs to enable an animal to grip when entering or exiting the animal house 1.

Figure 7:
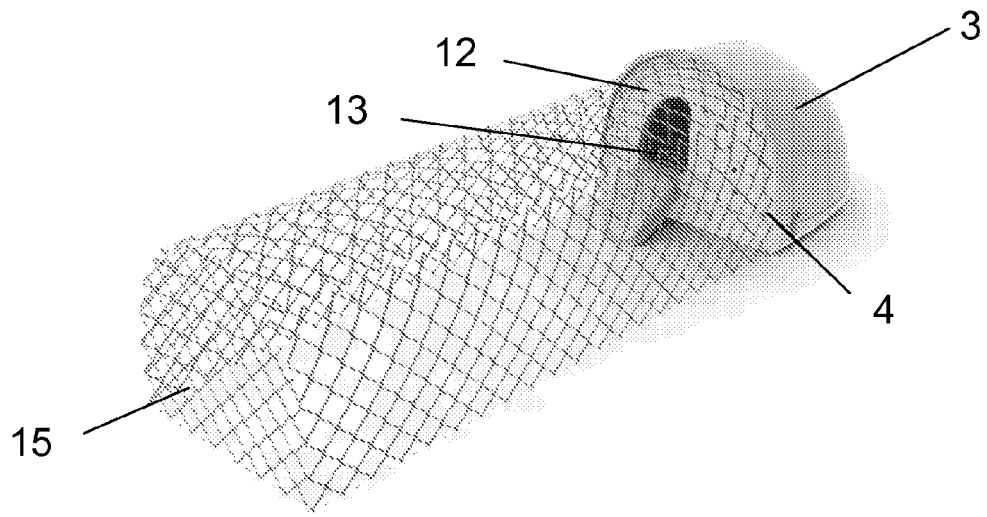
FIG. 7 shows the animal house of FIG. 6, with the cover in a closed position, and an entry and exit ramp in an open position, and showing one example of a run affixed to the house.

The holes 9 within the arch 4 may also be used for attaching an animal run 15 or fencing structure to the animal house 1, as shown in FIG. 7. The run 15 allows the animal space outside the animal house 1, whilst still provided protection from predators, and keeping the animal contained within an area. The run 15 may be formed from wire mesh or plastic grid. The run 15 may also be attached to the cover 3 or directly to the base 2.

Figure 8:
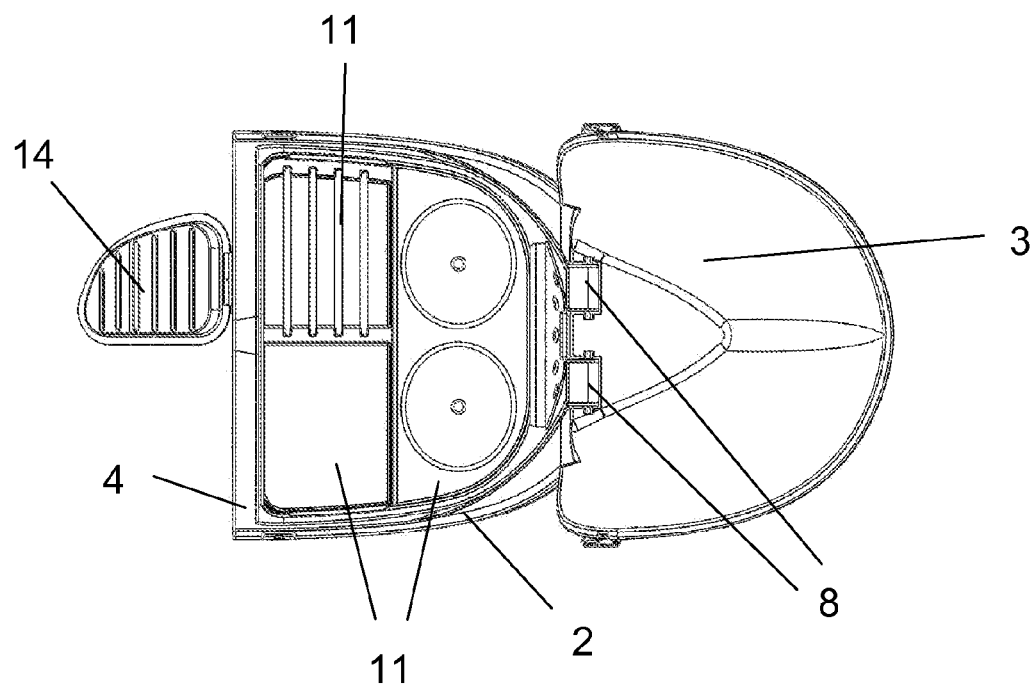
FIG. 8 shows a plan view of the animal house of FIGS. 6 and 7, with the cover in an open position, and showing one embodiment of interchangeable inserts within the base.

FIG. 8 shows the plan view of one arrangement of exchangeable inserts 11. The exchangeable inserts 11 make the animal house 1 reconfigurable, and therefore modular in construction for the pet owner. The animal house 1 can be purchased without any exchangeable inserts 11 within the base 2, and these would then be offered separately to the pet owner. Or the animal house may come configured with one or more exchangeable inserts 11 within the base 2. The animal house 1 may also incorporate one of a number of different closure means 10 for the arch 4. The animal house 1 may come provided with the closure means 10 already secured within the arch 4, and the pet owner would purchase the style of closure means 10 required for keeping a particular type of animal. The closure means 10 may however also be interchangeable by the pet owner, should a change of use of the animal house 1 be required after purchase.

FIG. 8 shows one version of animal house 1 comprising a pair of hinges 8, that are integral within the base 2 and cover 3 to provide protection from the elements. A metal hinge 8 when exposed to environmental conditions is likely to rust if not provided with some protection. By housing the hinge 8 within the base 2 and cover 3 the hinge 8 is likely to last longer and perform better.

FIGS. 9 and 10 show two examples of inserts 11 for use with housing poultry. FIG. 11 shows an example of an exchangeable insert 11 for canine use. Other exchangeable inserts 11 may be provided for other animals or other situations—e.g. for use by rabbits, guinea pigs or other domestic livestock.

The animal house 1 may also incorporate heating means, not shown in the figures, to provide warmth to the animal when exposed cold climates, and the cover 3 and base 2 may incorporate insulation means to keep the heat within the animal house 1. For example, an electrical heating pad may be provided.

Figure 12:
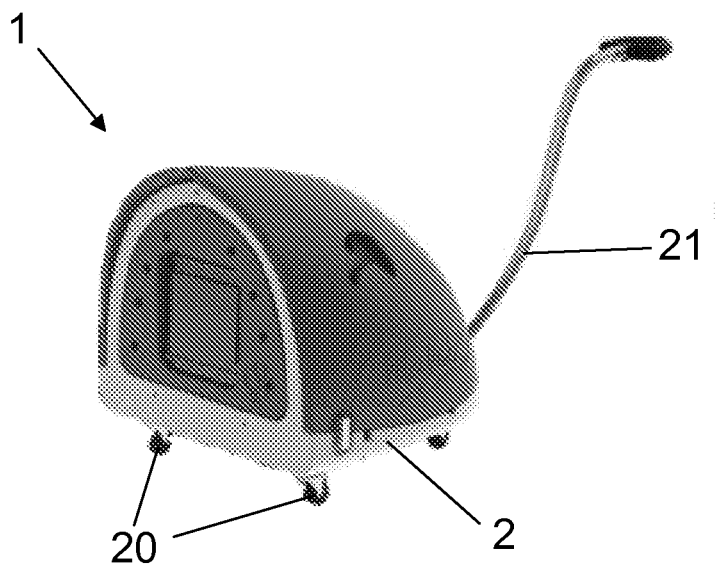
FIG. 12 shows an animal house with casters and a handle.

Other features that might be incorporated include rings within the cover 3 or base 2 for securing the animal house 1 to a surface with camping stakes or other means. The animal house 1 might also comprise a plurality of legs to raise the animal house to a height above ground level, thus preventing damp and enabling ease of access by a pet owner in a standing position. Wheels may also be incorporated instead of or as well as the legs, to enable the animal house 1 to be manoeuvred about more easily. FIG. 12 illustrates an animal house 1 in which the base 2 is mounted on casters 20 and a handle 21 is removably engaged with the base 2, to facilitate manoeuvring of the animal house 1.

The components of the animal house 1, to include the base 2, cover 3, exchangeable inserts 11, arch 4 and a number of the closure means 10 are preferably formed from injection moulded plastic. The animal house 1 will therefore be more durable than typical hutches and pens made from wood, that have a tendency to rot. The plastic also ensures that the animal house 1 is wipe cleanable and hygienic, and can be hosed down if required.

It will be appreciated that the illustrated embodiments of the invention provide animal houses that are in keeping with modern trends, whilst providing an easy to maintain and clean dwelling for an animal. The modular design of the animal houses, with exchangeable base inserts and end wall inserts, facilitates economical manufacture of animal houses for different animals, based on a common base and cover, and enables users to adapt existing animal houses for use by different animals.

In the illustrated embodiments, the arch 4 and various closure means or inserts form an end wall along one side of the base 2. In alternative embodiments, the arch 4 may be dispensed with and a larger end wall removably engaged with the base 2, the end wall cooperating with the cover 3 when in position. For example, the base 2 may be formed with a groove to receive an end wall, with releasable fastening means to secure the end wall in position. The end wall may be exchanged with another end wall of a different configuration, to suit different animals and/or different occasions.

In this specification, the verb "comprise" has its normal dictionary meaning, to denote non-exclusive inclusion. That is, use of the word "comprise" (or any of its derivatives) to include one feature or more, does not exclude the possibility of also including further features.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An animal house comprising:
   a. a base;
   b. a cover affording a roof and side walls for the house and engaging with the base;
   c. releasable fastening means arranged to secure the cover to the base such that, when released, the cover may be removed to afford access to the base from above; and
   d. an end wall of the house that is integrally formed with the base and comprises an arch extending upwardly from the base and closure means engaging with the arch.

2. An animal house according to claim 1, wherein the cover is pivotally secured to the base by a hinge.

3. An animal house according to claim 1, wherein said closure means comprises a wire mesh.

4. An animal house according to claim 1, wherein said closure means comprises a panel that incorporates a door or an opening for an animal to enter or leave the house.

5. An animal house according to claim 4, wherein the door comprises a ramp secured by a hinge to the panel.

6. An animal house according to claim 1, wherein the base is provided with a plurality of exchangeable inserts to provide facilities for different animals.

7. An animal house according to claim 6, wherein the exchangeable inserts include one or more of the group comprising feeding receptacles, roosting receptacles, perching bars and litter trays.

8. An animal house according to claim 1, wherein a further end wall extends upwardly from the base, is disposed along one side thereof, and incorporates a plurality of ventilation holes.

9. An animal house according to claim 8, wherein said further end wall is of a material of greater weight than the base.

10. An animal house according to claim 9, wherein said further end wall counterbalances the weight of the cover when the cover is pivoted to an open position.

11. An animal house according to claim 1, wherein the base incorporates a plurality of legs to raise the animal house above ground level.

12. An animal house according to claim 1, wherein the base incorporates a plurality of wheels for moving the animal house.

13. An animal house according to claim 1, wherein the base comprises securing means for securing the animal house to a surface.

14. An animal house according to claim 1, wherein the base end wall and cover comprise plastics material.

15. An animal house according to claim 14, wherein the base, end wall and cover are formed by injection moulding.

16. An animal house according to claim 1, further comprising an animal run that engages with the base, end wall and/or cover.

17. An animal house according to claim 1, wherein said end wall extends along a respective side of the base.

18. An animal house according to claim 1, including interchangeable closure means of the end wall.

* * * * *